V. POULSEN.
RECEIVER FOR WIRELESS TRANSMISSION SIGNALS.
APPLICATION FILED FEB. 7, 1911.

1,087,549.

Patented Feb. 17, 1914.

Witnesses:
Waldo M. Chapin
Ida M. Patterson

Inventor:
Valdemar Poulsen
by
Rosenbaum & Stockbridge
attys

UNITED STATES PATENT OFFICE.

VALDEMAR POULSEN, OF COPENHAGEN, DENMARK.

RECEIVER FOR WIRELESS-TRANSMISSION SIGNALS.

1,087,549. Specification of Letters Patent. Patented Feb. 17, 1914.

Original application filed September 16, 1905, Serial No. 278,777. Divided and this application filed February 7, 1911. Serial No. 607,189.

*To all whom it may concern:*

Be it known that I, VALDEMAR POULSEN, a subject of the King of Denmark, residing at St. Blichersvej No. 22, Copenhagen, Denmark, have invented certain new and useful Improvements in Receivers for Wireless-Transmission Signals, of which the following is a full, clear, and exact description.

This invention relates to the wireless transmission of signals, the present application being a division of my Patent No. 1,059,391, granted April 22, 1913.

In the majority of transmitters now employed in wireless telegraphy, the oscillations are not only rapidly damped, but also have a comparatively long interval between each interruption, and it is the common practice to use in the receiving system a wave detector, which is permanently connected to the receiving circuit. In such a system, however, it is impossible to obtain the highest degree of resonance, since the dampening of the oscillations and the intervals between them tend to prevent resonance. In order to obtain the highest degree of resonance it is desirable to use a transmitter comprising a generator of some character that is capable of sending out the waves continuously and uniformly for instance the generator as described in my U. S. Patents Nos. 789449 and 793608. Transmitters employing generators of this character tend to produce vibrations in the receiving device of a tuned system, of the highest amplitude. But in experiments with such apparatus, I have found when the wave detector is permanently connected to the resonant circuit, that the damping of said circuit is increased and consequently the amplitude decreased.

The object of the present invention is, therefore to provide a system in which the highest possible resonance is obtained in the receiver, and is not interfered with by other devices or apparatus forming a part of the tuned receiving system.

The invention comprises means whereby the wave detector forming a part of the receiving system is only intermittently connected with the receiving system proper or resonant circuit, whereby the intervals of disconnection will afford time for the vibrations to build up to the highest amplitude undisturbed by the wave detector. In carrying out my invention, a terminal or the terminals of the wave detector, is, or are, alternately connected with and disconnected from the resonant circuit by means of an ordinary vibrator similar to that used in an electric bell.

Figure 1:
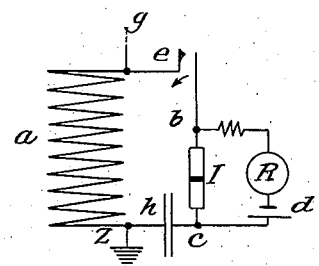
Figure 2:
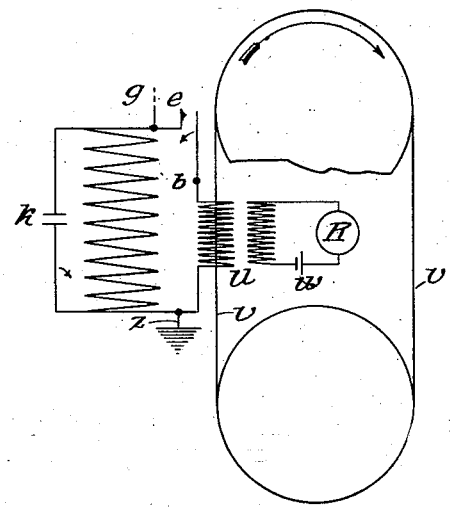

Referring to the accompanying drawings, Figures 1 and 2 illustrate diagrammatic examples of the arrangement of a receiving system according to my invention.

The two figures show modifications in the manner of connecting up the various apparatuses, all within the scope of the invention.

$g$ indicates the antenna, $a$ the receiving coil or resonance, $z$ the earth connection, I the coherer or wave indicator or detector, either chemical or any other sort, having the terminals $b$ and $c$; R the relay in the local circuit, which also includes the battery $d$.

$e$ is the terminal of the receiving coil $a$.

In Fig. 1 the connection is made so that the local circuit containing the relay is permanently closed through the indicator I, the vibrator then serving only to interrupt the connections between the coherer and the coil $a$. In this case the condenser $h$ is inserted between the terminal $c$ of the coherer and the coil $a$ to prevent the flow of battery from the local circuit through the coil $a$ when the vibrator is in contact at $e$.

Fig. 2 is a diagram of a receiving coil $a$ combined with a magnetic detector diagrammatically illustrated in which the intermittent contact is effected between the contacts $b$ and $e$. Such a magnetic detector is diagrammatically illustrated in this figure and includes a transformer $u$ through which an iron wire $v$ is moved and magnetized by means of a battery $w$. The current from this battery flows through one coil of the transformer giving the iron wire a certain magnetization. If currents flow in the other coil this magnetization will be partly broken down and the detector R will respond.

The means for obtaining the intermittent connections between the terminal $b$ and the contact $e$ may be greatly varied, the particular means being not of great importance in connection with my invention. It may be done for instance by means of vibrating wires, tuning forks, etc., or by means of rotary interrupters or commutators.

What I claim, is:

1. In a receiver for wireless transmission of signals, the combination of a wave detector, a device which receives energy from space, and a circuit independent of said device, means for intermittently disconnecting the wave detector from said device, and a source of extraneous power for continuously operating said means, whereby said detector is continuously in said circuit independent of said device.

2. In a receiver for wireless transmission of signals, the combination of a wave detector, a device which receives energy from space, a circuit independent of said device and having an electrically operated appliance therein, a source of current for said circuit, and means for intermittently connecting the wave detector and the device aforesaid, the latter being maintained at all times out of circuit with said current source, and the wave detector having current from said source normally passing continuously therethrough.

3. In a receiver for wireless transmission of signals, the combination of a wave detector, a device which receives energy from space, a circuit independent of said device and having an electrically operated appliance therein, a source of current for said circuit, and means for intermittently connecting the wave detector and the device aforesaid, the wave detector having current from said source normally passing continuously therethrough.

In witness whereof, I subscribe my signature, in the presence of two witnesses.

VALDEMAR POULSEN.

Witnesses:
  VIGGO BLOM,
  C. V. SCHON.